(12) United States Patent
Flagg

(10) Patent No.: US 6,282,793 B1
(45) Date of Patent: Sep. 4, 2001

(54) COPING SAW ATTACHMENT FOR A HAND HELD POWER JIG SAW

(76) Inventor: James F. Flagg, 5645 Echodell Ave. NW., North Canton, OH (US) 44720

( * ) Notice: Subject to any disclaimer, the term of this patent is extended or adjusted under 35 U.S.C. 154(b) by 0 days.

(21) Appl. No.: 09/373,089

(22) Filed: Aug. 12, 1999

(51) Int. Cl.⁷ .................................................. B27B 11/00
(52) U.S. Cl. ................................ 30/122; 30/392; 30/509
(58) Field of Search ........................... 30/122, 392, 509, 30/166.3, 393, 394; 83/750, 902

(56) References Cited

U.S. PATENT DOCUMENTS

| | | |
|---|---|---|
| 2,884,027 | 4/1959 | Pulera et al. . |
| 3,373,779 * | 3/1968 | Taft ........................................ 30/394 |
| 3,585,719 * | 6/1971 | Kivela ................................ 30/166.3 |
| 3,895,438 | 7/1975 | Burkepile et al. . |
| 4,365,397 * | 12/1982 | Felpel ..................................... 30/122 |
| 4,505,037 | 3/1985 | Farkas . |
| 5,035,059 | 7/1991 | Takahashi et al. . |
| 5,138,769 | 8/1992 | Takahaski et al. . |
| 5,303,471 * | 4/1994 | Liberatoscioli ........................ 30/122 |

FOREIGN PATENT DOCUMENTS

642681 * 3/1937 (DE) ...................................... 30/509

* cited by examiner

Primary Examiner—Hwei-Slu Payer
(74) Attorney, Agent, or Firm—Oldham & Oldham Co., L.P.A.

(57) ABSTRACT

A coping saw attachment for a hand held power jig saw which is capable of being quickly and easily attached to a standard hand held power jig saw. The coping saw attachment for a hand held power jig saw generally includes a substantially "c-shaped" coping saw blade support member which supports a standard coping saw blade, a handle which is removably attached on either side of the substantially "c-shaped" coping saw blade support member and a coping saw blade adapter which facilitates the attachment of a standard coping blade into a hand held power jig saw blade chuck. The outward end of the substantially "c-shaped" coping saw blade support member retains the outwardly extending end of the standard coping saw blade and the substantially "c-shaped" coping saw blade support member has sufficient flexibility to move and retain force on the standard coping saw blade as the hand held power jig saw moves the standard coping saw blade up and down in a substantially vertical orientation. Thus, the coping saw attachment for a hand held power jig saw allows a standard hand held power jig saw to be quickly and easily converted into a hand held power coping saw to permit "coping" cuts to be made in ornamental woodwork.

20 Claims, 3 Drawing Sheets

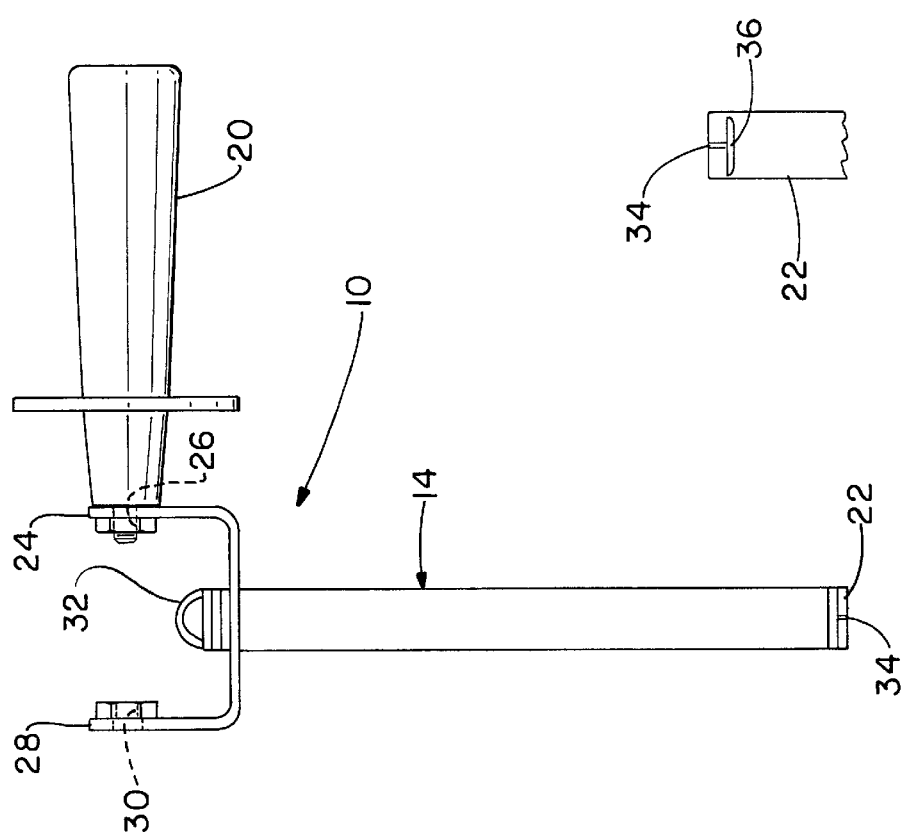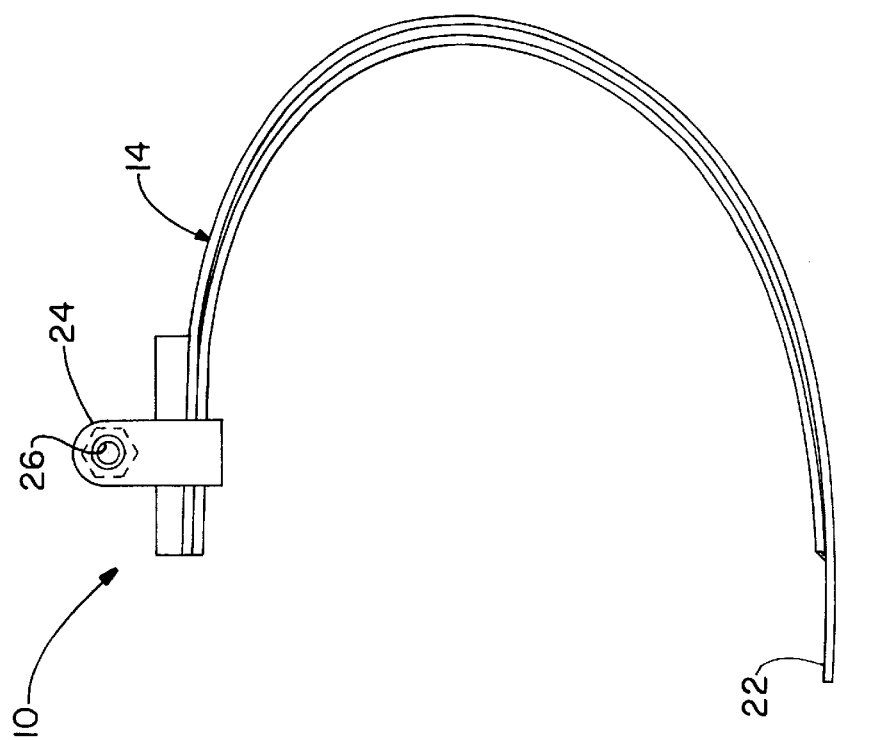

COPING SAW ATTACHMENT FOR A HAND HELD POWER JIG SAW

BACKGROUND AND SUMMARY OF THE INVENTION

The present invention relates generally to new and novel improvements in a coping saw attachment for a hand held power jig saw. More particularly, the present invention relates to a coping saw attachment for a hand held power jig saw which permits "coping" saw cuts to be made in ornamental woodwork to facilitate forming ninety (90) degree corner joints in such ornamental woodwork.

A typical ninety (90) degree corner joint between two (2) "standard" pieces of woodwork generally consists of making corresponding forty five (45) degree cuts on the adjoining ends of each of the two (2) "standard" pieces of woodwork to create a ninety (90) degree joint between the two (2) "standard" pieces of woodwork. While such a ninety (90) degree corner joint works relatively well with many relatively simple "standard" woodwork configurations, it does not work so well with woodwork having more ornamental configurations, such as, for example, many types of crown molding, chair rail and baseboard molding. In these cases, it may be necessary to cope a back cut behind the forty (45) degree cut to remove additional material on one or both of the ornamental woodwork members to be joined to provide clearance and facilitate forming a visually appealing ninety (90) degree corner joint.

"Coping" cuts have traditionally been made using a manual coping saw which consists of a handle, a substantially "c-shaped" coping blade support member and a coping saw blade. The coping saw blade is relatively thin and use of a manual coping saw provides flexibility for the user in making the "coping" cuts in one or both of the ornamental woodwork pieces to be joined. While the use of a manual coping saw to make "coping" cuts works well, it is rather slow and time consuming. In addition, since the user has to provide all of the power for the manual coping saw to make the "coping" cuts, users can become fatigued if multiple "coping" cuts are made.

Accordingly, an object of the present invention is the provision of a coping saw attachment for a hand held power jig saw which permits "coping" cuts to be made using a standard coping saw blade in conjunction with a hand held power jig saw.

Another object of the present invention is the provision of a coping saw attachment for a hand held power jig saw which is capable of being quickly and easily attached to a standard hand held power jig saw to convert the standard hand held power jig saw into a hand held power coping saw using a standard coping saw blade to facilitate the making of "coping" cuts in ornamental woodwork.

These and other objects of the present invention are attained by a coping saw attachment for a hand held power jig saw which is capable of being quickly and easily attached to a standard hand held power jig saw. The coping saw attachment for a hand held power jig saw generally includes a substantially "c-shaped" coping saw blade support member which supports a standard coping saw blade, a handle which is removably attached on either side of the substantially "c-shaped" coping saw blade support member and a coping saw blade adapter which facilitates the attachment of a standard coping blade into a hand held power jig saw blade chuck. An outwardly extending end of the substantially "c-shaped" coping saw blade support member retains the outwardly extending end of the standard coping saw blade and the substantially "c-shaped" coping saw blade support member has sufficient flexibility to move and retain force on the standard coping saw blade as the hand held power jig saw moves the standard coping saw blade up and down in a substantially vertical orientation. Thus, the coping saw attachment for a hand held power jig saw in accordance with the present invention allows a standard hand held power jig saw to be quickly and easily converted into a hand held power coping saw to permit "coping" cuts to be made in ornamental woodwork.

Other advantages and novel features of the present invention will become apparent in the following detailed description of the invention when considered in conjunction with the accompanying drawings.

BRIEF DESCRIPTION OF THE DRAWINGS

FIG. 3 is a side elevational view of a coping saw support which comprises a primary member of the coping saw attachment;

FIG. 4 is a front elevational view of the coping saw support member shown in FIG. 3;

FIG. 5 is a partial bottom view of the coping saw support member taken at the end which attaches to a coping saw blade;

DETAILED DESCRIPTION OF THE DRAWINGS

Figure 1:
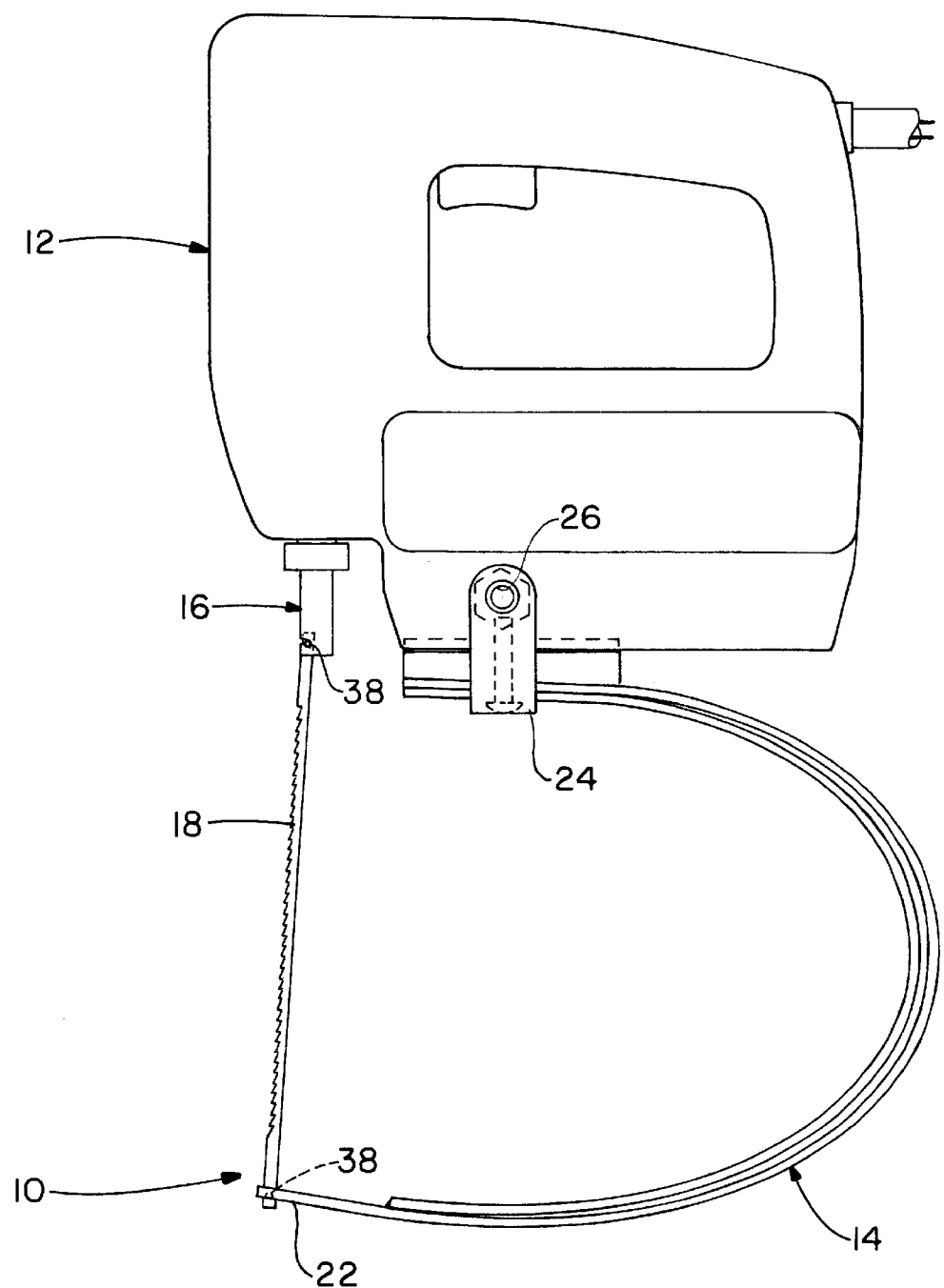
FIG. 1 is a side elevational view of an assembly comprising a coping saw attachment in accordance with this invention as such may be mounted to a power jig saw.
Figure 8:
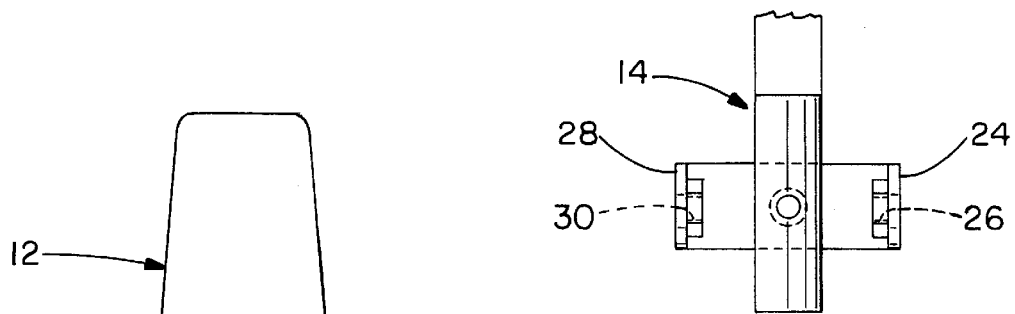
FIG. 8 is a top view of the coping saw support member shown in FIG. 3 as taken at the jig saw mounting end thereof.
Figures 2, 6, 7:
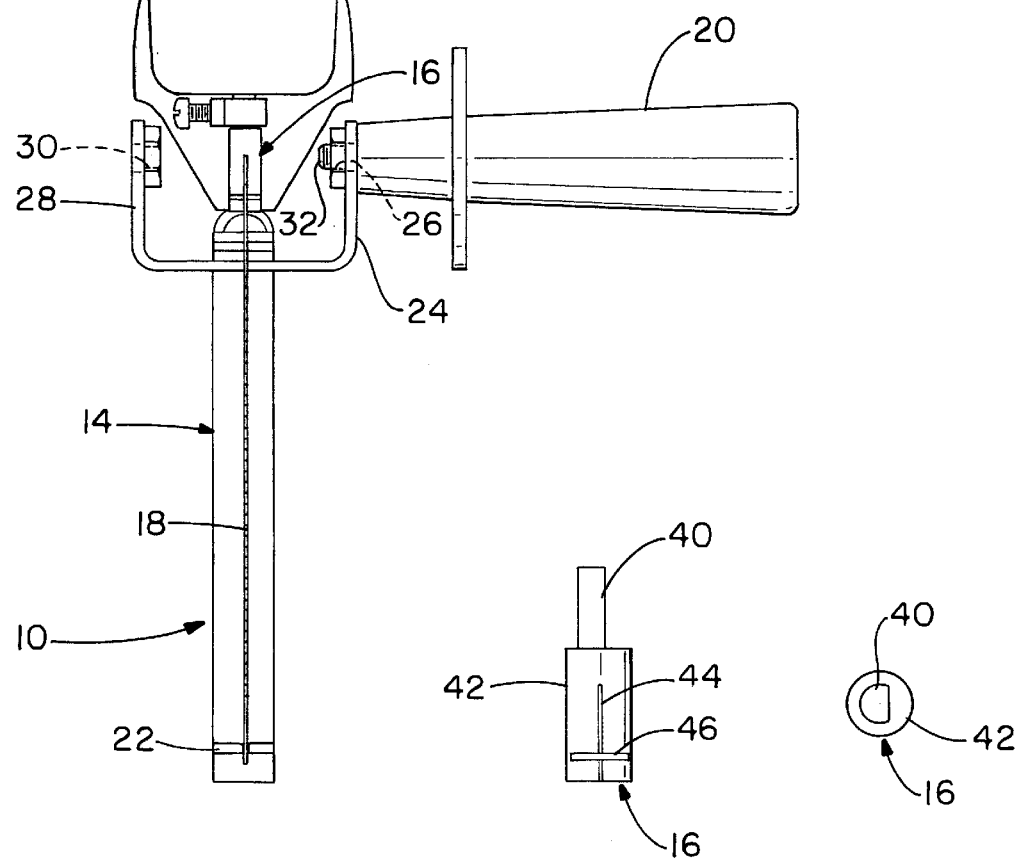
FIG. 2 is a front elevational view of the assembly illustrated in FIG. 1.
FIG. 6 is a front elevational view of a coping saw adapter forming a secondary member of the coping saw attachment.
FIG. 7 is a top view of the adapter member shown in FIG. 6.

In the following detailed description of a preferred embodiment of the present invention, reference is made to the accompanying drawings which, in conjunction with this detailed description, illustrate and describe a preferred embodiment of a coping saw attachment for a hand held power jig saw in accordance with the present invention. Referring to FIGS. 1 through 8, coping saw attachment for a hand held power jig saw, generally identified by reference number 10, is capable of being quickly and easily attached to standard hand held power jig saw 12. While standard hand held power jig saw 12 shown in the drawings is a Skil® model 4235 hand held power jig saw distributed by S-B Power Tool Company in Chicago, Ill., other standard hand held power jig saws could alternatively be used in conjunction with coping saw attachment for a hand held power jig saw 10 in accordance with the present invention.

Coping saw attachment 10 for a hand held power jig saw 12 generally includes substantially "c-shaped" coping saw blade support member 14, coping saw adapter 16, coping saw blade 18, which is preferably a standard coping saw blade, and handle 20. Substantially "c-shaped" coping saw blade support member 14 preferably includes substantially "c-shaped" coping saw blade support arm 22 which is preferably fabricated from a resilient material having some flexibility, such as a spring steel. More preferably, substantially "c-shaped" coping saw blade support 22 is fabricated from an inner substantially "c-shaped" coping saw blade support arm member and an outer substantially "c-shaped" coping saw blade support arm member which are positioned next to each other and are joined together by, for example, welding together each end thereof. Both the inner substantially "c-shaped" coping saw blade support aim and the outer substantially "c-shaped" coping saw blade support arm member are preferably fabricated from a resilient material having some flexibility, such as spring steel, such that substantially "c-shaped" coping saw blade support arm 22 has sufficient flexibility to move and retain force on coping saw blade 18 as standard hand held power jig saw 12 moves coping saw blade 18 up and down in a substantially vertical orientation.

Substantially "c-shaped" coping saw blade support member 14 is preferably attached to the bottom surface of standard hand held power jig saw 12 using a removable mechanical fastener, such as a threaded machine screw, which passes through an opening in substantially "c-shaped" coping saw blade support member 14 and is received in and secured to a corresponding threaded opening in the bottom surface of standard hand held power jig saw 12. In addition, substantially "c-shaped" coping saw blade support member 14 includes at least one, and most preferably two (2), outwardly and upwardly extending handle support arms, first outwardly and upwardly extending support arm 24 and second outwardly and upwardly extending support arm 28, respectively. First outwardly and upwardly extending support arm 24 preferably has first internally threaded opening 26 which is capable of receiving and supporting threaded projection 32 extending from handle 20 and second outwardly and upwardly extending support arm 28 preferably has second internally threaded opening 30 which is also capable of receiving and supporting threaded projection 32 extending from handle 20. Threaded projection 32 extending from handle 20 can be selectively placed in either first internally threaded opening 26 in first outwardly and upwardly extending handle support arm 24 or second internally threaded opening 30 in second outwardly and upwardly extending handle support arm 28 to selectively provide handle 20 on either side of substantially "c-shaped" coping saw blade support member 14.

The outwardly extending end of substantially "c-shaped" coping saw blade support arm 22 preferably includes coping saw blade receiving slot 34 which is preferably slightly wider than coping saw blade 18 so coping saw blade 18 is removably received in coping saw blade receiving slot 34. The bottom surface of substantially "c-shaped" coping saw blade support arm 22 preferably includes coping saw blade receiving groove 36 which removably receives and positions lower outwardly extending projections 38 on coping saw blade 18 in relation to substantially "c-shaped" coping saw blade support arm 22.

Coping saw adapter 16 preferably includes upwardly extending portion 40 which is substantially semi-circular in configuration. Upwardly extending portion 40 of coping saw adapter 16 is removably received and secured in the jig saw blade chuck on standard hand held power jig saw 12. Coping saw adapter 16 also preferably includes downwardly extending portion 42 which receives and secures coping saw blade 18. In particular, downwardly extending portion 42 of coping saw adapter 16 includes substantially vertically oriented coping saw blade receiving slot 44 which is preferably slightly wider than coping saw blade 18 so coping saw blade 18 is removably received in substantially vertically oriented coping saw blade receiving slot 44. Downwardly extending portion 42 of coping saw adapter 16 also preferably includes substantially horizontally oriented coping saw blade receiving slot 46 which removably receives and positions upper outwardly extending projections 38 on coping saw blade 18 in relation to coping saw blade adapter 16.

To attach coping saw attachment 10 for a hand held jig saw to standard hand held power jig saw 12, the jig saw blade is first removed from the jig saw blade chuck in standard hand held power jig saw 12. Upwardly extending portion 40 of coping saw blade adapter 16 is then placed in and secured in the jig saw blade chuck. Substantially "c-shaped" coping saw blade support member 14 is then secured to the bottom surface of standard hand held power jig saw 12 by inserting a mechanical fastener, such as a threaded machine screw, through an opening in substantially "c-shaped" coping saw blade support member 14 into a corresponding threaded opening in the bottom surface of standard hand held power jig saw 12. Handle 20 is then attached to the desired side of substantially "c-shaped" coping saw blade support member 14 by inserting threaded projection 32 of handle 20 into one of first internally threaded opening 26 in first outwardly and upwardly extending handle support arm 24 or second internally threaded opening 30 in second outwardly and upwardly extending handle support arm 28. The upper end of coping saw blade 18 is then slid through substantially vertically oriented coping saw blade receiving slot 44 in coping saw blade adapter 16 and upper outwardly extending projections 38 on coping saw blade 18 are positioned in and retained by substantially horizontally oriented coping saw blade receiving slot 46 in downwardly extending portion 42 of coping saw adapter 16. The lower end of coping saw blade 18 is then slid through coping saw blade receiving slot 34 in substantially "c-shaped" coping saw blade support arm 22 and lower outwardly extending projections 38 on coping saw blade 18 are positioned in and retained by coping saw blade receiving groove 36 in the bottom surface of substantially "c-shaped" coping saw blade support arm 22. At this time, standard hand held power jig saw 12 is ready to be used as a hand held power coping saw.

To remove coping saw attachment for a hand held power jig saw 10 from standard hand held power jig saw 12, the ends of substantially "c-shaped" coping saw blade support arm 22 are brought closer together to allow lower outwardly extending projections 38 on coping saw blade 18 to be removed from coping saw blade receiving groove 36 and coping saw blade receiving slot 34 in substantially "c-shaped" coping saw blade support arm 22. The upper end of coping saw blade 18 is then slid through substantially vertically oriented coping saw blade receiving slot 44 in coping saw blade adapter 16 and coping saw blade 18 is removed from coping saw blade adapter 16. Handle 20 is then removed from first internally threaded opening 26 in first outwardly and upwardly extending handle support arm 24 or second internally threaded opening 30 in second outwardly and upwardly extending handle support arm 28. Substantially "c-shaped" coping saw blade support member 14 is then removed from the bottom surface of standard hand held power jig saw 12 by removing the mechanical fastener, such as a threaded machine screw, from the corresponding threaded opening in the bottom surface of standard hand held power jig saw 12 and pulling the mechanical fastener, such as a threaded machine screw, through the opening in substantially "c-shaped" coping saw blade support member 14 to remove substantially "c-shaped" coping saw blade support member 14. Upwardly extending portion 40 of coping saw blade adapter 16 is then removed from the jig saw blade chuck and the jig saw blade is inserted into the jig saw blade chuck in standard hand held power jig saw 12. At this time, standard hand held power jig saw 12 is again ready to be used as a hand held power jig saw.

Accordingly, although the present invention has been described above in detail, the same is by way of illustration and example only and is not to be taken as a limitation on the present invention. It is apparent to those having a level of ordinary skill in the relevant art that other variations and modifications in the construction of coping saw attachment for a hand held power jig saw could be readily made using the teachings of the present invention. For example, substantially "c-shaped" coping saw blade support arm 22 could be fabricated as an integral single piece using a suitable material rather than consisting of an inner substantially "c-shaped" coping saw blade support arm member and an outer substantially "c-shaped coping saw blade support arm member as described above. Accordingly, the scope and content of the present invention are to be defined only by the terms of the appended claims.

What is claimed is:

1. A hand held power coping saw, comprising:
   a coping saw blade having an upper portion and a lower portion;
   a coping saw blade adapter capable of securing said upper portion of said coping saw blade in a coping saw blade chuck in the hand held power coping saw; and
   a substantially "c-shaped" coping saw blade support member which is attached to the hand held coping saw, said substantially "c-shaped" coping saw blade support member being capable of resiliently securing said lower portion of said coping saw blade.

2. The hand held power coping saw in accordance with claim 1, wherein said substantially "c-shaped" coping saw blade support member includes a substantially "c-shaped" coping saw blade support arm which is fabricated from a resilient flexible material and said substantially "c-shaped" coping saw blade support arm flexes upwardly and downwardly as said coping saw blade is moved upwardly and downwardly by said coping saw blade chuck in said hand held power coping saw.

3. The hand held power coping saw in accordance with claim 2, wherein said substantially "c-shaped" coping saw blade support arm is fabricated from a spring steel material.

4. The hand held power coping saw in accordance with claim 1, wherein said lower portion of said coping saw blade includes lower outwardly extending projections which are removably received and positioned in a coping saw blade receiving groove in said substantially "c-shaped" coping saw blade support member and said upper portion of said coping saw blade includes upper outwardly extending projections which are removably received and positioned in said coping saw blade chuck in said hand held power coping saw.

5. The hand held power coping saw in accordance with claim 1, further including a handle outwardly extending from said substantially "c-shaped" coping saw blade support member.

6. The hand held power coping saw in accordance with claim 1, further including a handle outwardly extending from said substantially "c-shaped" coping saw blade support member which is removably attached to said substantially "c-shaped" coping saw blade support member.

7. The hand held power coping saw in accordance with claim 1, wherein said substantially "c-shaped" coping saw blade support member includes at least one outwardly and upwardly extending handle support arm having an internally threaded opening and further including a handle having a threaded projection which is removably received in and secured in said internally threaded opening in said at least one outwardly and upwardly extending handle support arm.

8. The hand held power coping saw in accordance with claim 1, wherein said substantially "c-shaped" coping saw blade support member includes a first outwardly and upwardly extending handle support arm having a first internally threaded opening positioned on one side of said hand held power coping saw and a second outwardly and upwardly extending handle support arm having a second internally threaded opening positioned on an opposite side of said hand held power coping saw and further including a handle having a threaded projection which is removably received in and secured in one of said first internally threaded opening in said first outwardly and upwardly extending handle arm and said second internally threaded opening in said second outwardly and upwardly extending handle arm.

9. The hand held power coping saw in accordance with claim 1, wherein said substantially "c-shaped" coping saw blade support member is removably secured to said hand held power coping saw by a mechanical fastener which passes through an opening in said substantially "c-shaped" coping saw blade support member and is received in and secured in a threaded opening in the hand held power coping saw.

10. A coping saw attachment for a hand held power jig saw having a jig saw blade chuck, said coping saw attachment comprising:
    a coping saw blade having an upper portion and a lower portion;
    a coping saw blade adapter capable of securing said upper portion of said coping saw blade in the jig saw blade chuck in the hand held power jig saw; and
    a substantially "c-shaped" coping saw blade support member which is capable of being removably attached to the hand held jig saw, said substantially "c-shaped" coping saw blade support member being capable of resiliently securing said lower portion of said coping saw blade.

11. The coping saw attachment in accordance with claim 10, wherein said substantially "c-shaped" coping saw blade support member includes a substantially "c-shaped" coping saw blade support arm which is fabricated from a resilient flexible material and said substantially "c-shaped" coping saw blade support arm flexes upwardly and downwardly as said coping saw blade is moved upwardly and downwardly by the jig saw blade chuck in the hand held power jig saw.

12. The coping saw attachment in accordance with claim 11, wherein said substantially "c-shaped" coping saw blade support arm is fabricated from a spring steel material.

13. The coping saw attachment in accordance with claim 10, wherein said lower portion of said coping saw blade includes lower outwardly extending projections which are removably received and positioned in a coping saw blade receiving groove in said substantially "c-shaped" coping saw blade support member and said upper portion of said coping saw blade includes upper outwardly extending projections which are removably received and positioned in a substantially horizontally oriented coping saw blade receiving slot in said coping saw blade adapter.

14. The coping saw attachment in accordance with claim 10, further including a handle outwardly extending from said coping saw attachment.

15. The coping saw attachment in accordance with claim 10, further including a handle outwardly extending from said coping saw attachment which is removably attached to said coping saw attachment.

16. The coping saw attachment in accordance with claim 10, wherein said substantially "c-shaped" coping saw blade support member includes at least one outwardly and upwardly extending handle support arm having an internally threaded opening and further including a handle having a threaded projection which is removably received in and secured in said internally threaded opening in said at least one outwardly and upwardly extending handle support arm.

17. The coping saw attachment in accordance with claim 10, wherein said substantially "c-shaped" coping saw blade support member includes a first outwardly and upwardly extending handle support arm having a first internally threaded opening positioned on one side of the hand held power jig saw and a second outwardly and upwardly extending handle support arm having a second internally threaded opening positioned on an opposite side of the hand held power jig saw from said first outwardly and upwardly extending handle support arm and further including a handle having a threaded projection which is removably received in and secured in one of said first internally threaded opening in said first outwardly and upwardly extending handle arm and said second internally threaded opening in said second outwardly and upwardly extending handle arm.

18. The coping saw attachment in accordance with claim 10, wherein said substantially "c-shaped" coping saw blade support member is removably secured to the hand held power jig saw by a mechanical fastener which passes through an opening in said substantially "c-shaped" coping saw blade support member and is received in and secured in a threaded opening in the hand held power jig saw.

19. A method of converting a hand held power jig saw having a jig saw blade retained in a jig saw blade chuck into a hand held power coping saw, comprising the steps of:
　placing an upwardly extending portion of a coping saw blade adapter into the jig saw blade chuck;
　securing a substantially "c-shaped" coping saw blade support member to the hand held power jig saw;
　sliding an upper end of a coping saw blade through a substantially vertically oriented coping saw blade receiving slot in said coping saw blade adapter;
　positioning and retaining upper outwardly extending projections on said coping saw blade in a substantially horizontally oriented coping saw receiving slot in said coping saw blade adapter;
　sliding a lower end of said coping saw blade through a coping saw blade receiving slot in said substantially "c-shaped" coping saw blade support member; and
　positioning and retaining lower outwardly extending projections on said coping saw blade in a coping saw blade receiving groove in said substantially "c-shaped" coping saw blade support member.

20. The method of converting a hand held power jig saw having a jig saw blade retained in a jig saw blade chuck into a hand held power coping saw in accordance with claim 19, further comprising the step of removably attaching a handle to said substantially "c-shaped" coping saw blade support member following the step of "securing a substantially "c-shaped" coping saw blade support member to the hand held power jig saw."

* * * * *